Oct. 27, 1936.  W. A. RIDDELL  2,058,506
FOCAL PLANE SHUTTER
Filed June 11, 1935  2 Sheets-Sheet 1
FIG.1.
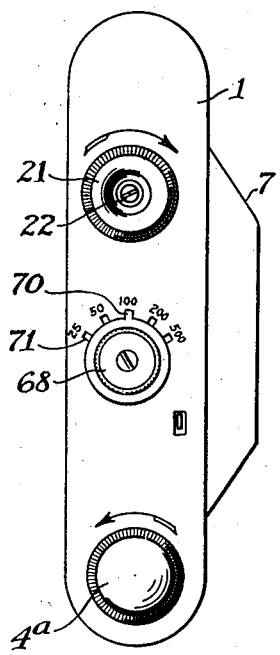
FIG.2.
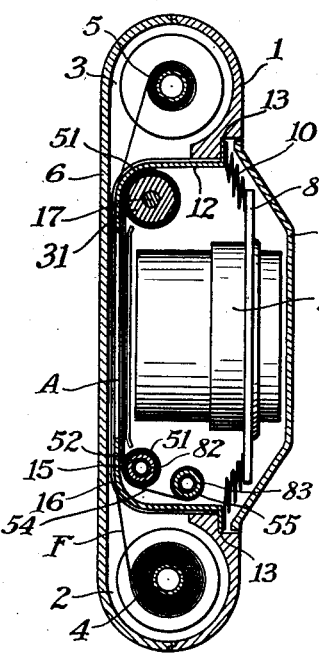
FIG.3.
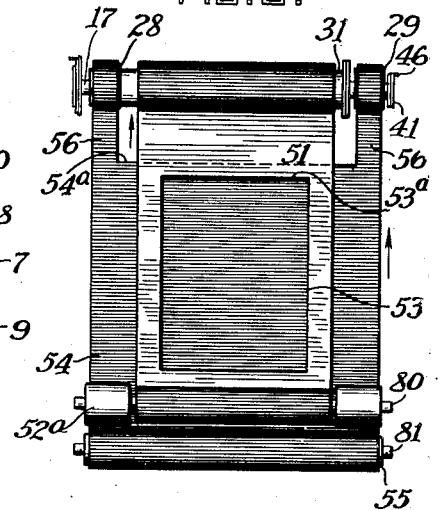
FIG.4.
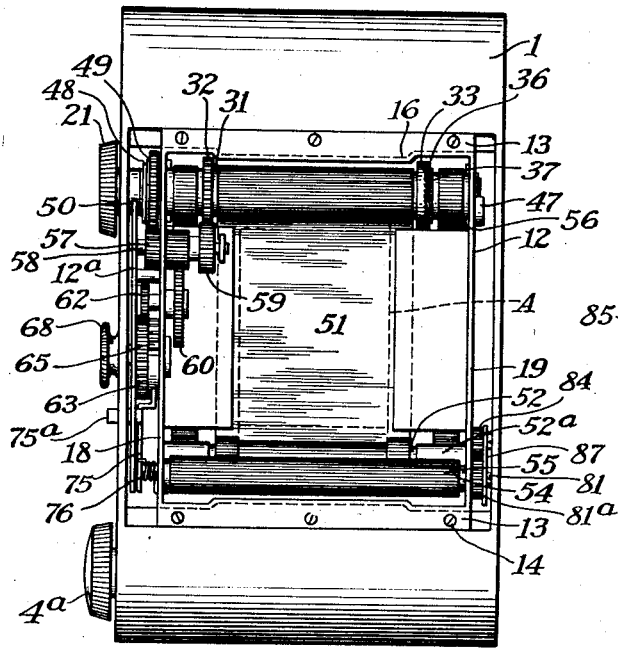
FIG.5.
FIG.6.
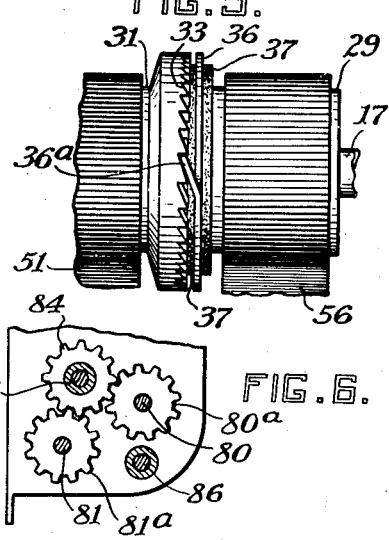
INVENTOR.
William A. Riddell
BY
ATTORNEYS Oct. 27, 1936.　　　W. A. RIDDELL　　　2,058,506
FOCAL PLANE SHUTTER
Filed June 11, 1935　　　2 Sheets-Sheet 2
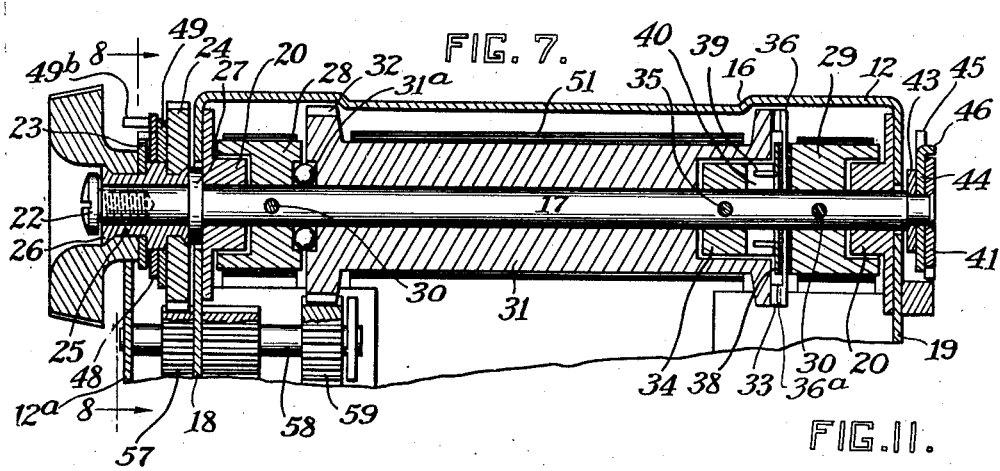
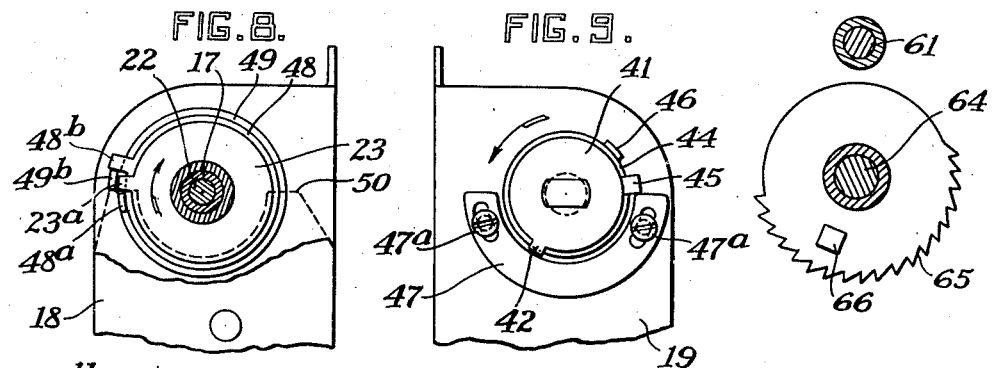
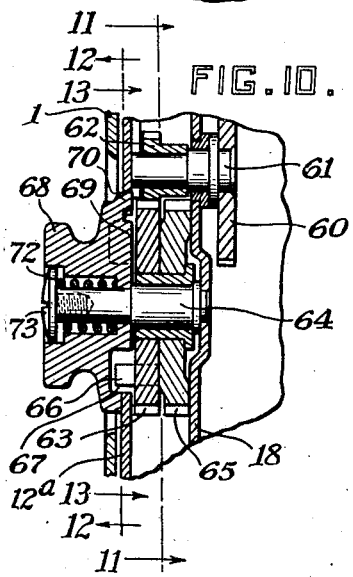
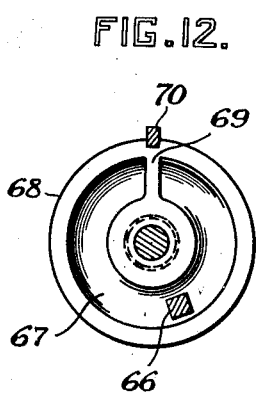
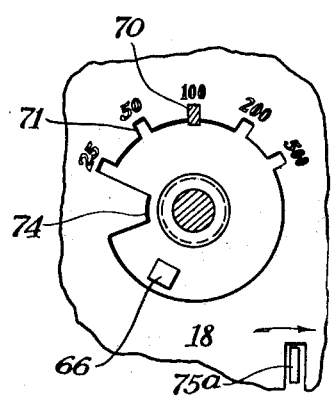
INVENTOR.
William A. Riddell
BY
ATTORNEYS Patented Oct. 27, 1936

2,058,506

UNITED STATES PATENT OFFICE 2,058,506

FOCAL PLANE SHUTTER

William A. Riddell, Rochester, N. Y., assignor, by mesne assignments, to Eastman Kodak Company, Jersey City, N. J., a corporation of New Jersey Application June 11, 1935, Serial No. 26,025

14 Claims. (Cl. 95—57)

This invention relates to focal plane shutters, and an object of the invention is to produce a shutter mechanism in which two curtains can be readily adjusted relative to each other to vary the exposure aperture. Another object is to provide a simple form of clutch between rollers carrying the two curtains. Another object is to provide a means for retaining the exposure aperture constant during exposure and other objects will appear from the following specifications the novel features being particularly pointed out in the claims at the end thereof.

In small sized cameras, and particularly in small sized cameras intended primarily for use with roll film, there is comparatively little space to mount the so-called focal plane or curtain shutter. I have provided an extremely simple type of focal plane shutter which may have a wide variation in shutter speeds due to the adjustable width of the exposure aperture, and I have also provided a shutter which can be contained in a relatively small space.

Coming now to the drawings wherein like reference characters denote like parts throughout:

Fig. 1 is a side elevation of a camera having a shutter embodying this invention;

Fig. 2 is a vertical section thereof;

Fig. 3 is an elevation of the shutter curtains separated from the enclosing parts of the mechanism and in somewhat diagrammatic form;

Fig. 4 is a front view of the camera body and shutter, the bed and lens and associated parts being removed;

Fig. 5 is an enlarged fragmentary view of a part of Fig. 4;

Fig. 6 is a side elevation, enlarged, of a part of Fig. 4;

Fig. 7 is a sectional elevation of the upper portion of the shutter mechanism;

Fig. 8 is a section on line 8—8 of Fig. 7;

Fig. 9 is a partial side elevation from the right end of Fig. 7;

Fig. 10 is a vertical section of the central portion of the shutter at the left side of Fig. 4; and Figs. 11, 12 and 13 are sections on lines 11—11, 12—12 and 13—13 respectively of Fig. 10.

Broadly speaking, my shutter consists of two separate curtains, each one of which may be wound upon a spring-driven roller at one end, and the opposite ends of each of the curtains are attached to coaxially arrange spools which are separate save for a clutch member. This clutch member includes friction surfaces tending to cause the spools carrying the two curtains to move together in both directions. The clutch likewise includes a means for definitely connecting the spools so that they will move together during at least a portion of their movement in one direction. The reason for definitely connecting the spools is that it is highly desirable to insure that the width of the slot between the two curtain members will remain the same width throughout all of the exposure. It is also necessary to have the two curtains move independently of each other at the beginning and at the end of each exposure—in the one case for closing the slot to wind the shutter across the exposure area, and in the other case to permit the slot to open up before the exposure is made.

In other words, my shutter is what is known as a self-capping shutter, that is to say, the opening in the shutter is completely closed during the shutter winding or setting operation.

A shutter constructed in accordance with a preferred embodiment of the present invention is shown mounted in a camera of the usual folding type, wherein a camera body 1, having film spool chambers 2 and 3 for spools 4 and 5 respectively, has a back or closure 6 and a bed 7. A lens board 8 carries the lens mount 9 and the front end of bellows 10, the rear of the latter having suitable light-tight connection with the camera body 1. An external winding knob 4a may be provided for turning the spool 4 as is usual in roll film cameras. The foregoing parts are not illustrated in full detail, as they may be of any suitable construction and are merely indicated to such extent as will make clear their relation to the shutter.

The shutter mechanism is mounted on and within a housing 12, which is comparatively deep. Flanges 13 at the top and bottom of the housing 12 lie in suitable recesses in the camera body 1 and screws or pins 14 serve to secure the housing in place, with its rear wall 15 close to and parallel with the camera back 6. A groove or recess 16 is provided in the rear wall 15 to serve as a guide for the film F.

Near the top of the housing 12 is a shaft 17 extending through the side walls 18 and 19 of the housing (Fig. 7), and freely revolvable in trunnions 20. A knob 21, a washer 23 and a gear 24, are secured on a sleeve 25 in a suitable manner, as by riveting or staking the ends 26 of the sleeve, and these parts as a unit are free to turn on the shaft 17 without rotating the latter or being rotated by it. The sleeve 25 is retained on the shaft 17 by a stud 22, the position of the sleeve longitudinally of the shaft being established by a flange 27.

Near the knob end of the shaft 17 is a drum 28 and at the other end of the shaft is a similar drum 29, both of these drums being secured to the shaft 17 to turn with it, as by pins 30. Between the drums 28 and 29 is a spool 31, free to rotate on the shaft 17, and having flanged ends. The flange nearest the drum 28 carries a gear 32, while the flange toward the drum 29 has a circle of ratchet teeth 33 on its end face.

Within the spool 31 is a collar 34 pinned to the shaft 17 at 35, and between this collar and the drum 29 is a metal disc 36 between two washers 37 of fiber or similar friction-surfaced material. A metal washer 38, with lugs 39 that engage slots 40 in the collar 34 is between the latter and one of the discs 37. In assembling the foregoing parts, they are pressed together and the pins 30 and 35 are then set so that there will be considerable frictional engagement between the disc 36, washers 37 and 38, collar 34 and drum 29. Anti-friction bearings 31a may be interposed between the spool 31 and the drum 28 to permit free relative movement of these members. The disc 36 has two or more tongues 36a that engage the ratchet teeth 33 when the assembly is completed as above mentioned, so that the disc 36 the drums 28 and 29, and the shaft 17 will move with the spool 31 when the spool is rotated in the direction of the upper arrow in Fig. 1. The results of such movement will be described hereafter.

On the end of shaft 17 opposite knob 21 is fixed a disc 41 having a radially-projecting lug 42 (Fig. 9). Between this disc and a plain washer 43 (Fig. 7) is a disc 44 having a radial lug 45 and a laterally bent lug 46. The disc 44 is in light frictional engagement with the washer 43 and the disc 41, so that it will be carried around with the disc 41 when the shaft 17 is first rotated, but will be stopped when the lug 45 strikes one end of an adjustable stop 47. This stop may be mounted on the shutter housing 12 by means of screws 47a extending through slots in the stop piece. The above arrangement permits the shaft 17 to be rotated a predetermined amount, being in the present instance approximately one and one-quarter revolutions.

At the knob end of shaft 17 is a group of discs arranged to limit in a similar manner the turns that the knob 21 may make, for purposes which will presently appear. Two discs, 48 and 49 are loose on the sleeve 25, and the third, 23, is fast on the sleeve as hereinbefore mentioned. As the knob 21 is turned as indicated by the arrow in Fig. 8, a radial lug 23a on the disc 23 picks up the disc 48 after the shaft 17 has made approximately one revolution, by contacting a lateral lug 48a thereon, and a radial lug 48b on said disc 48, after both 23 and 48 have made another revolution, picks up disc 49 by contacting its lateral lug 49b. The lug 49b strikes the upper front edge 50 of a subframe 12a that is mounted at one side of the housing 12, thus preventing further rotation of the knob 21, gear 24, and sleeve 25. The arrangement and relative positions of the various stop lugs may be modified as required, the knob 21 in the present instance being permitted to make approximately 2½ revolutions.

The curtain members which constitute controllable exposure elements are arranged to move vertically in a plane close to the film F. The front curtain member 51 of the shutter is wound on the spool 31 and on a spring-actuated curtain roll 52 near the bottom of the housing 12. This front curtain has an aperture 53 that corresponds to an exposure aperture A in the rear wall 15 of the housing 12.

The rear curtain 54 is wound on a spring-actuated roll 55 below and in front of the roll 52, and the upper portion of this curtain terminates in tabs 56 which are attached to and wound on the drums 28 and 29 previously described.

As in many shutters of the focal plane type, the two curtains are arranged to have independent movement when the shutter is being "set", whereby the height or area of the exposure aperture is controllable, and to have coincident movement when released, to cause this aperture or slot to move uniformly past the frame aperture A. The variable-height slot is obtained by moving or "winding-up" the curtain 51 farther than the curtain 54, whereby the upper edge 53a of the aperture 53 is carried past the upper edge 54a of the curtain 54 to a distance that may be from a fraction of an inch up to a distance equal to the full height of the aperture 53.

The gear 24 meshes with another 57, on an idler shaft 58 (Fig. 7) which in turn carries a gear 59 that meshes with the gear 32 forming part of the spool 31. The latter therefore must rotate when the knob 21 is turned, whether shaft 17 moves or not. However, the shaft 17 being in frictional engagement with spool 31, as previously described moves with it until stopped by the lug 46 on the washer 44, so that under the above condition, the curtains 51 and 54 are simultaneously drawn from their rolls 52 and 55 and are partially wound up on the spool 31 and on the drums 28 and 29 respectively. However, the drums 28 and 29 and therefore curtain 54, are stopped by the stoppage of shaft 17. If the knob 21 is further turned the spool 31 will continue to wind up the curtain 51 and draw the edge 53a past the edge 54a of the rear curtain 54 to provide an exposure slot on the return movement of both curtains.

The distance the edge 54a moves before the drums 28 and 29 are stopped by the discs 44, 46, etc. is sufficient to carry said edge above the top of frame A, so that there will be no exposure slot or gap within the exposure area. The maximum amount of winding or overrun of the edge 53a after the drums 28 and 29 have been stopped is determined by the lug 49b as previously described, such maximum preferably being equal to the height of frame A. Means, about to be described, are provided for limiting the "overrun" of edge 53a to a plurality of lesser distances to control and determine the height of the exposure slot.

Through a gear 60 on an idler shaft 61, a pinion 62 drives a gear 63 on a shouldered stud 64 that projects through the side wall 18 of casing 12, (Fig. 11). A ratchet 65 is in effect, part of gear 63, by reason of a stop pin 66 projecting through its latter, so that the ratchet and gear move together. The stop pin 66 projects into an annular recess 67 in a timing knob 68. The recess 67 is interrupted by a bridge 69 that may be engaged by the pin 66 in certain positions of the knob 68, selective positions of the knob being determined by an index point 70, adapted to engage any one of a series of notches 71 in the subframe plate 12a. This index point drops readily into the selected notch under pressure of a spring 72 that reacts against a retaining screw 73 to press the knob 68 toward the housing. A stop 74 (Fig. 13) in the plate 12a also limits the extreme movement of the pin 66.

It will be apparent that if the index point 70 is set into the notch farthest to the left in Fig. 13, the bridge 69 in the timing knob 68 will permit the stop pin 66 to move a distance in the direction indicated in Fig. 12 that will be considerably greater than said pin could move if the index point were set in the notch farthest to the right, thus the turns made by the spool 31 may be varied to carry the edge 53a of the curtain 51 a greater or a lesser distance beyond the edge 54a of the curtain 54 after the latter has been stopped to provide an exposure slot of differing heights. It will be understood that the bridge 69 prevents further movement of the curtain 51 when contacted by pin 66, regardless of the positions and action of the discs 48 and 49 etc.

A pawl 75, having a lug 75a projecting through the wall 18, is held in contact with the ratchet 65 by a spring 76, to retain the entire mechanism in the "set" position until the lug 75a is moved in the direction of the arrow in Fig. 13, whereupon the spring-actuated rolls 52 and 55 are free to act in unison and pull down the curtains 51 and 54, and carrying the exposure aperture from top to bottom of the frame A to make the exposure.

After release, the curtain 54 comes to rest first, at a point determined by the contact of lug 45 with the stop 47, said lug moving at this time in a direction opposite to the arrow in Fig. 9. The roll 52, still being turned by its spring 82 to wind the curtain 51 on itself, causes the spool 31 to overcome the frictional grip of the washers 37 and 38, and the ratchet 33 then overruns the tongues 36a on the disc 36, until the roll 52 has carried the curtain 51 a distance sufficient to re-establish the relative positions of the two curtains indicated in Fig. 3, although the portions which are shown as overlapping actually will be on the rolls 52 and 55 respectively. Free-turning sleeves 52a on the roll 52 facilitate the relative movement of the two curtains and obviate the necessity of an idler roll for the curtain 54.

While the springs which wind up rolls 52 and 55 are not illustrated in detail, being of well known "curtain-roll" construction, means are embodied in this invention whereby the tension of these springs may be adjusted. To this end, pintles 80 and 81 are connected respectively, to the springs 82 and 83 in rolls 52 and 55, and extend through the wall 19 of the housing 12 and carry pinions 80a and 81a which are fast to said pintles (Fig. 6). These latter turn together whenever the pintle of either is rotated, by reason of their connection through an idler pinion 84. Screws 85 and 86 pass through a clamp plate 87, and by setting up these screws the plate 87 holds the pinions 80a and 81a against rotation, preventing springs 82 and 83 from unwinding. By loosening the two screws 85 and 86, the pintles 80 and 81 may be turned by a suitable tool, the rotation or "winding" of either one correspondingly moving the other, so that the tension of each spring is increased to the same extent. The screws are then tightened and the plate 87 then holds the three pinions and therefore the pintles, against rotation.

It should be noted that in the construction of this shutter one element of the shutter curtains is moved to "set" position positively, through the gear connections actuated from the manually-operated windup knob, whereas the second curtain element is moved to "set" position through frictional engagement with the first element, until arrested by a stop. This frictional engagement is also effective when the shutter is released, until one element is stopped at the end of its return movement, the other element then overcoming this frictional engagement and being carried to its stop position by actuating means of sufficient power.

While I have illustrated and described a preferred embodiment of my invention, it will be understood that the invention is not confined to the single type illustrated and described but only by the appended claims.

I claim:

1. In a curtain shutter, the combination with two curtains, each defining a part of a variable exposure aperture, of three coaxially arranged drums for supporting portions of the two curtains, a friction clutch between two of the drums supporting portions of the two curtains, and a pawl and ratchet for causing the clutch to always drive in turning in one direction.

2. In a curtain shutter, the combination with two curtains, each defining a part of a variable exposure aperture, of a shaft, a plurality of drums carried by said shaft adapted to support portions of the two curtains, the drum carried by said shaft for supporting a portion of one curtain being free to turn on said shaft, the other curtain drum supporting rollers being keyed to said shaft, means tending to turn the keyed drum from the drum free to turn thereon.

3. In a curtain shutter, the combination with two curtains, each defining a part of a variable exposure aperture, of a shaft, a plurality of drums carried by said shaft adapted to support portions of the two curtains, the drum carried by said shaft for supporting a portion of one curtain being free to turn on said shaft, the other curtain drum supporting rollers being keyed to said shaft, means including a pawl and ratchet for turning the free drum from the keyed drum in one direction.

4. In a curtain shutter, the combination with two curtains, each defining a part of a variable exposure aperture, of a shaft, a plurality of drums carried by said shaft adapted to support portions of the two curtains, the drum carried by said shaft for supporting a portion of one curtain being free to turn on said shaft, the other curtain drum supporting rollers being keyed to said shaft means tending to turn the keyed drum from the drum free to turn on the shaft and means for positively connecting the keyed and free drums for turning the former in one direction.

5. In a curtain shutter, the combination with two curtains, each defining a part of a variable exposure aperture, a spring driven roller for one end of each curtain, a plurality of coaxially arranged drums for supporting the opposite ends of each curtain, a shaft supporting said coaxially arranged drums revolvably supporting one drum and keyed to another drum, means for limiting the number of revolutions the shaft and keyed drum can make, a winding knob, connections between the winding knob and revolvably mounted drum for manually turning said drum, and a slip connection between said drum and said keyed drum tending to turn the keyed drum from the revolvably mounted drum.

6. In a curtain shutter, the combination with two curtains, each defining a part of a variable exposure aperture, a spring driven roller for one end of each curtain, coaxially arranged drums for supporting the opposite ends of each curtain, a shaft supporting said coaxially arranged drums, revolvably supporting one drum and keyed to another drum, a winding knob, gearing connecting the winding knob and the revolvably supported shaft, an adjustable stop limiting the winding movement of the knob and drum, and slip connections between the revolvably mounted drum and the keyed drum tending to turn the latter with the former.

7. In a curtain shutter, the combination with two curtains, each defining a part of a variable exposure aperture, a spring driven roller for one end of each curtain, coaxially arranged drums for supporting the opposite ends of each curtain, a shaft supporting said coaxially arranged drums, revolvably supporting one drum and keyed to another drum, a winding knob, gearing connecting the winding knob and the revolvably supported shaft, an adjustable stop limiting the winding movement of the knob and drum, and slip connections between the revolvably mounted drum and the keyed drum tending to turn the latter with the former, and supplementary means for turning the drums together in one direction.

8. In a curtain shutter, the combination with two curtains, each defining a part of a variable exposure aperture, a spring driven roller for one end of each curtain, coaxially arranged drums for supporting the opposite ends of each curtain, a shaft supporting said coaxially arranged drums, revolvably supporting one drum and keyed to another drum, a winding knob, gearing connecting the winding knob and the revolvably supported shaft, an adjustable stop limiting the winding movement of the knob and drum, and slip connections between the revolvably mounted drum and the keyed drum tending to turn the latter with the former, and supplementary means for turning the drums together in one direction, including a pawl member, said pawl member also forming a part of said slip connection.

9. In a curtain shutter, the combination with two curtains, each defining a part of a variable exposure aperture, a spring driven roller for one end of each curtain, coaxially arranged drums for supporting the opposite ends of each curtain, a shaft supporting said coaxially arranged drums, revolvably supporting one drum and keyed to another drum, a winding knob, gearing connecting the winding knob and the revolvably supported shaft, an adjustable stop limiting the winding movement of the knob and drum, and slip connections between the revolvably mounted drum and the keyed drum tending to turn the latter with the former, said slip connection including friction surfaces and a spring washer carrying a pawl, a ratchet carried by the revolvably mounted drum for said pawl to engage whereby the two drums may be driven through said pawl and ratchet through at least a portion of their relative movements.

10. In a curtain shutter, the combination with two curtains, each defining a part of a variable exposure aperture, a spring driven roller for one end of each curtain, coaxially arranged drums for supporting the opposite ends of each curtain, a shaft supporting said coaxially arranged drums, revolvably supporting one drum and keyed to another drum, a winding knob, gearing connecting the winding knob and the revolvably supported shaft, an adjustable stop limiting the winding movement of the knob and drum, and slip connections between the revolvably mounted drum and the keyed drum tending to turn the latter with the former, said slip connection including a pawl, a ratchet for the pawl to engage said pawl and ratchet supplementing said slip connection in driving the drums together through a portion of their relative movement in one direction.

11. In a curtain shutter, the combination with two curtains, each defining a part of a variable exposure aperture, a spring driven roller for one end of each curtain, coaxially arranged drums for supporting the opposite ends of each curtain, a winding knob for winding portions of each shutter on the coaxially arranged drums, a trigger for releasing the shutter permitting the spring driven rollers to wind the curtains thereon, means including a slip clutch for causing the coaxially arranged rollers to unwind together during at least a portion of their movement.

12. In a curtain shutter, the combination with two curtains, each defining a part of a variable exposure aperture, a spring driven roller for one end of each curtain, coaxially arranged drums for supporting the opposite ends of each curtain, a winding knob for winding portions of each shutter on the coaxially arranged drums, a trigger for releasing the shutter permitting the spring driven rollers to wind the curtains thereon, means including a slip clutch for causing the coaxially arranged rollers to unwind together during at least a portion of their movement, said slip clutch including a pawl member as a part of the slip clutch, and a ratchet member on one drum, whereby continued movement of one curtain relative to the other is facilitated.

13. In a curtain shutter, the combination with two curtains, each defining a part of a variable exposure aperture, a spring driven roller for one end of each curtain, coaxially arranged drums for supporting the opposite ends of each curtain, a winding knob for winding portions of each shutter on the coaxially arranged drums, a trigger for releasing the shutter permitting the spring driven rollers to wind the curtains thereon, means including a slip clutch for causing the coaxially arranged rollers to unwind together during at least a portion of their movement, said slip clutch including a pawl member as a part of the slip clutch, and a ratchet member on one drum, said slip clutch including a spring washer keyed to one drum, a spring pawl carried by said washer, and a ratchet carried by the other drum whereby the coaxially arranged drums may be positively connected through at least a portion of their movement as the curtains are rewound on the spring drums.

14. In a curtain shutter, the combination with two curtains, each defining a part of a variable exposure aperture, a clutch member, a spring driven roller for one end of each curtain, coaxially arranged drums for supporting the opposite ends of each curtain, the two curtains being independently rollable back and forth between the spring drums and the coaxially arranged drums save for the clutch member, said clutch member including interengaging frictional surfaces tending to drive the drums together, and adapted to positively unite the drums for at least a portion of their movement in one direction.

WILLIAM A. RIDDELL.